United States Patent
Klier (10) Patent No.: US 9,878,738 B2
(45) Date of Patent: Jan. 30, 2018

(54) NON-LINEAR COMPENSATION CONTROLLER FOR ACTIVE STEERING SYSTEM IN A VEHICLE

(71) Applicant: Robert Bosch GmbH, Stuttgart (DE)

(72) Inventor: Willy J. Klier, Bloomfield Hills, MI (US)

(73) Assignee: Robert Bosch GmbH, Stuttgart (DE)

(*) Notice: Subject to any disclaimer, the term of this patent is extended or adjusted under 35 U.S.C. 154(b) by 869 days.

(21) Appl. No.: 13/838,175

(22) Filed: Mar. 15, 2013

(65) Prior Publication Data

US 2013/0261899 A1 Oct. 3, 2013

Related U.S. Application Data

(60) Provisional application No. 61/616,587, filed on Mar. 28, 2012.

(51) Int. Cl.
*B62D 6/00* (2006.01)

(52) U.S. Cl.
CPC .......... *B62D 6/005* (2013.01); *B62D 6/003* (2013.01)

(58) Field of Classification Search
USPC .......................................................... 701/42
See application file for complete search history.

(56) References Cited

U.S. PATENT DOCUMENTS

| | | | |
|---|---|---|---|
| 5,557,520 A * | 9/1996 | Suissa | B60T 8/172 701/32.9 |
| 6,035,251 A | 3/2000 | Hac et al. | |
| 6,161,905 A | 12/2000 | Hac et al. | |
| 6,233,513 B1 | 5/2001 | Furukawa et al. | |
| 6,640,923 B1 * | 11/2003 | Dominke | B62D 5/008 180/443 |

(Continued)

FOREIGN PATENT DOCUMENTS

| | | | |
|---|---|---|---|
| DE | 102004008045 | 9/2005 | |
| DE | 102004008045 A1 * | 9/2005 | B62D 6/00 |

(Continued)

OTHER PUBLICATIONS

Manning, W. et al., "A review of yaw rate and sideslip controllers for passenger vehicles," Transactions of the Institute of Measurement and Control, 2007, vol. 29, No. 2, pp. 117-135.

(Continued)

*Primary Examiner* — Jean-Paul Cass
(74) *Attorney, Agent, or Firm* — Michael Best & Friedrich LLP (57) ABSTRACT

Systems and methods are described for controlling vehicle steering. A target yaw rate and a target side-slip angle are determined for the vehicle and an initial steering angle setting is determined based on a position of a steering wheel operated by a driver of the vehicle. A nonlinear vehicle model is applied to calculate a compensated steering angle setting based on the initial steering angle setting, an actual yaw rate of the vehicle, and an actual side-slip angle of the vehicle. A steering system of the vehicle is then controls the angle of the front wheels of the vehicle based on the compensated steering angle and, by doing so, causes both the actual yaw rate and the actual side-slip angle to approach the target yaw rate and the target side-slip angle, respectively.

12 Claims, 6 Drawing Sheets

(56) References Cited

U.S. PATENT DOCUMENTS

| | | | |
|---|---|---|---|
| 6,856,868 B1 * | 2/2005 | Le | B60R 21/0132 180/197 |
| 6,865,461 B2 | 3/2005 | Neef et al. | |
| 6,954,691 B2 | 10/2005 | Roll et al. | |
| 7,590,481 B2 | 9/2009 | Lu et al. | |
| 7,660,654 B2 | 2/2010 | Lu et al. | |
| 8,296,107 B2 * | 10/2012 | Turner | G05B 13/027 703/12 |
| 2006/0064218 A1 * | 3/2006 | Subbian | B60R 21/0132 701/45 |
| 2006/0273657 A1 | 12/2006 | Wanke et al. | |
| 2007/0173997 A1 | 7/2007 | Shiozawa et al. | |
| 2007/0265750 A1 * | 11/2007 | Goto | B62D 5/008 701/41 |
| 2008/0059034 A1 | 3/2008 | Lu | |
| 2008/0082246 A1 | 4/2008 | Brown et al. | |
| 2009/0254244 A1 | 10/2009 | Xu et al. | |
| 2013/0261899 A1 * | 10/2013 | Klier | B62D 6/003 701/42 |
| 2014/0195112 A1 * | 7/2014 | Lu | B60G 17/015 701/37 |

FOREIGN PATENT DOCUMENTS

| | | | |
|---|---|---|---|
| EP | 1516800 A1 * | 3/2005 | B62D 6/00 |
| EP | 1889775 | 2/2008 | |
| EP | 1889775 B1 * | 1/2010 | |

OTHER PUBLICATIONS

Yazicioglu, Y. et al., "A fuzzy logic controlled Anti-lock Braking System (ABS) for improved braking performance and directional stability," Int. J. Vehicle Design, 2008, vol. 48, Nos. 3/4, pp. 299-315.

Zhang, J. et al., "A Fuzzy Synthesis Control Strategy for Active Four-Wheel Steering Based on Multi-Body Models," SAE International, SAE Technical Paper Series 2008-01-0603, Apr. 14-17, 2008, 11 pages.

International Search Report and Written Opinion for Application No. PCT/US2013/034116 dated Jul. 4, 2013 (10 pages).

* cited by examiner

NON-LINEAR COMPENSATION CONTROLLER FOR ACTIVE STEERING SYSTEM IN A VEHICLE

RELATED APPLICATIONS

This application claims priority to U.S. Provisional Application No. 61/616,587, filed on Mar. 28, 2012 and titled "SIDESLIP ANGLE AND YAW RATE CONTROL FOR ACTIVE STEERING SYSTEM IN A VEHICLE," the entire contents of which is incorporated herein by reference.

BACKGROUND

The present invention relates to vehicle control systems. More specifically, embodiments of the present invention relate to methods and systems for controlling vehicle systems (e.g., steering, braking, etc.) to regulate performance characteristics of the vehicle such as the yaw rate and the side-slip angle of the vehicle.

SUMMARY

Vehicle stability control systems are generally designed to improve the safety and the stability of a vehicle by detecting and minimizing vehicle skids. Conventional vehicle stability control systems primarily control yaw rate and only indirectly control the side-slip angle of a traveling vehicle. This indirect and imprecise control of the side-slip angle leads to unstable vehicle behavior. For example, such vehicle behavior is experienced during an open-loop maneuver on a low mue surface, where the driver keeps a constant steering angle over a long period of time. Unstable vehicle behavior is also experienced during an "increasing sine steering" maneuver.

The systems and methods described below simultaneously control the yaw rate and the side-slip angle of a vehicle by applying nonlinear compensation control to the vehicle steering. The proposed method uses control algorithms developed according to feedback linearization and sliding-mode theories.

In one embodiment, the invention provides a method for controlling vehicle steering by determining a target yaw rate and a target side-slip angle for a vehicle. In some cases, the side-slip angle is defined as substantially zero (i.e., no side-slip). An initial vehicle actuator setting is determined based on operator input and a nonlinear vehicle model is applied to calculate a compensated vehicle actuator setting based on the initial vehicle actuator setting, an actual yaw rate of the vehicle, and an actual side-slip angle of the vehicle. A vehicle actuator is controller based on the compensated vehicle actuator setting to cause both the actual yaw rate and the actual side-slip angle to approach the target yaw rate and the target side-slip angle.

In another embodiment, the invention provides a nonlinear compensation controller for controlling vehicle steering. The controller includes a processor and a memory storing instructions. When the instructions are executed by the processor, the controller receives an initial steering angle setting determined based on a position of a steering wheel operated by a driver of the vehicle. The controller then applies a nonlinear vehicle model to calculate a compensated steering angle setting based on the initial steering angle setting, an actual yaw rate of the vehicle, and an actual side-slip angle of the vehicle. The controller provides the compensated steering angle setting to a steering system of the vehicle which then controls the angle of the front wheels of the vehicle based on the compensated steering angle. By applying the compensated steering angle setting, both the actual yaw rate and the actual side-slip angle approach the target yaw rate and the target side-slip angle, respectively.

In yet another embodiment, the invention provides a method for controlling vehicle steering. A target yaw rate and a target side-slip angle are determined for the vehicle and an initial steering angle setting is determined based on a position of a steering wheel operated by a driver of the vehicle. A nonlinear vehicle model is applied to calculate a compensated steering angle setting based on the initial steering angle setting, an actual yaw rate of the vehicle, and an actual side-slip angle of the vehicle. A steering system of the vehicle is then controls the angle of the front wheels of the vehicle based on the compensated steering angle and, by doing so, causes both the actual yaw rate and the actual side-slip angle to approach the target yaw rate and the target side-slip angle, respectively.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
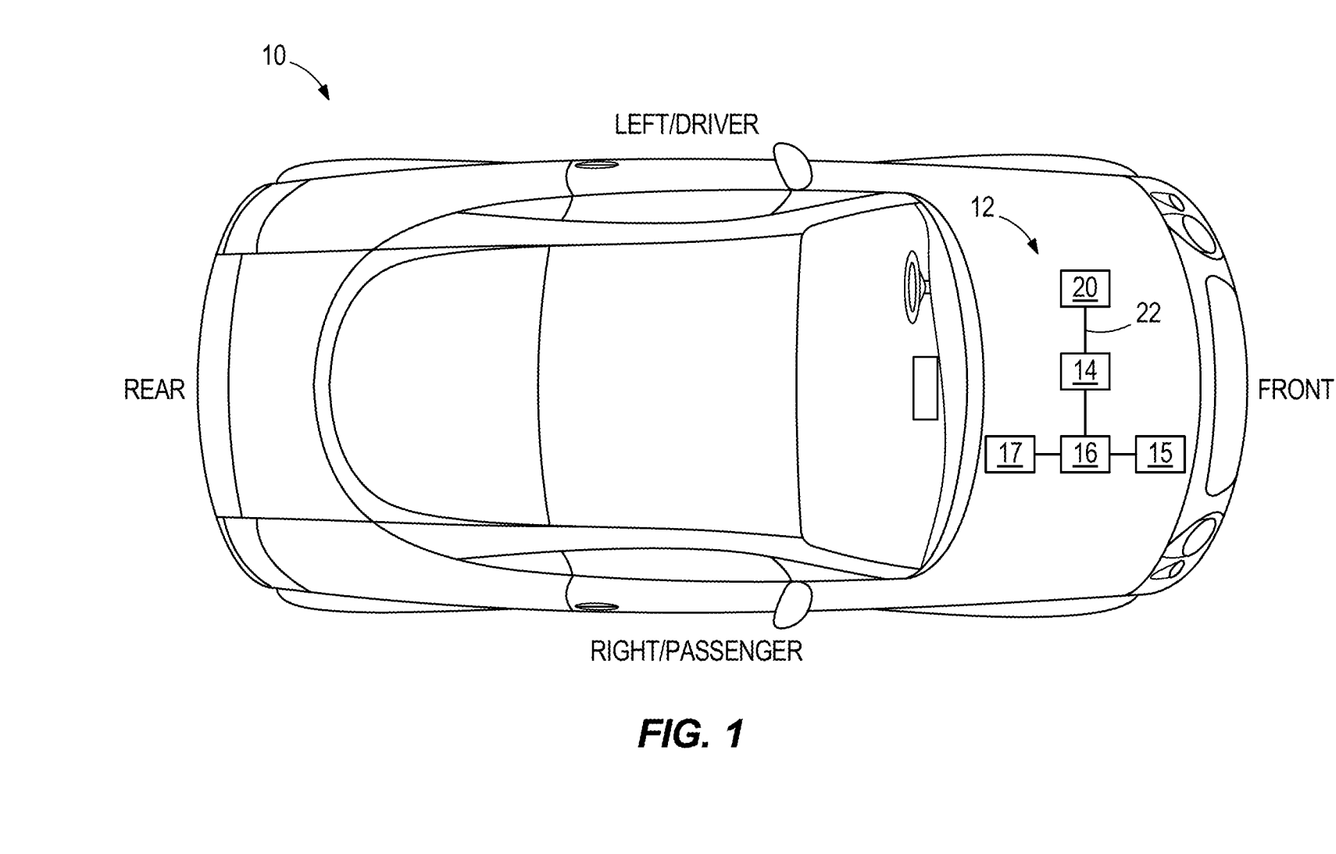
FIG. 1 is a top view of a vehicle including a schematic representation of a vehicle control system according to one embodiment.
Figure 2:
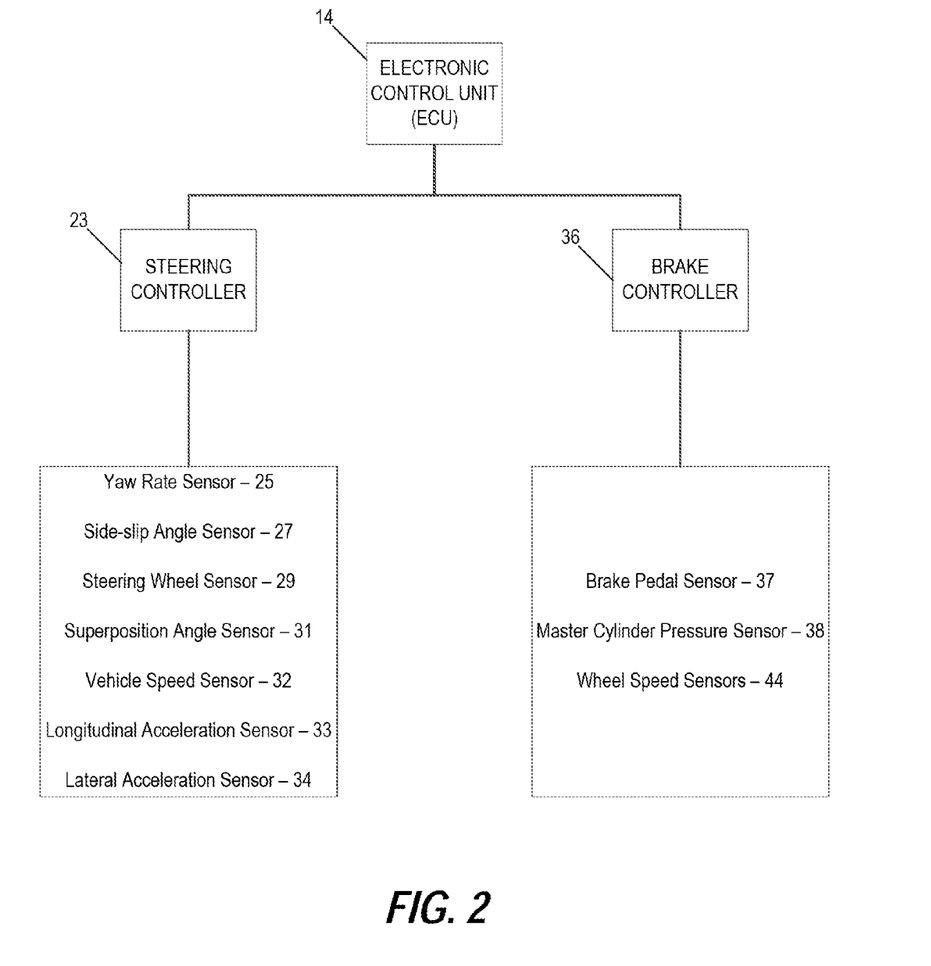
FIG. 2 is another schematic illustration of the vehicle control system of FIG. 1 illustrating the sensors in further detail.

FIG. 1 illustrates a vehicle 10. The vehicle 10 includes a control system 12 for controlling the operation (e.g., the steering and the braking) of the vehicle 10. The system 12 includes electronic control unit ("ECU") 14, a plurality of sensors 20, and a plurality of subsystems 15-17. For example, the subsystems can include a braking subsystem 15, a steering subsystem 16, and a drivetrain subsystem 17. Additional subsystems can include a traction control subsystem, a stability subsystem, and the like (not shown). In FIG. 1, all sensors in the system 12 are labeled with the reference numeral 20. A second set of sensor reference numerals, which are described in more detail below in referenced to FIG. 2, provide a specific label to differentiate various types of sensors from one another. The sensors 20 are connected to a network 22, such as a controller area network ("CAN") bus. The sensors 20 detect and provide information regarding the operating parameters of the vehicle. For example, the sensors 20 provide information about the vehicle's yaw dynamics.

As shown in FIG. 2, a yaw rate sensor 25, a sideslip angle sensor 27, a steering wheel sensor 29, a superposition angle sensor 31, a vehicle speed sensor 32, a longitudinal acceleration sensor 33, and a lateral acceleration sensor 34 transmit signals representing the current state of the vehicle's yaw dynamics to a steering controller 23 of the steering subsystem 16 over the network 22. The ECU 14 receives information from the steering controller 23. The steering controller 23 transmits signals on the network 22 (or a separate connection) representing a current state of the vehicle's steering system. The steering controller 23 can provide signals representing a yaw rate, a sideslip angle, a steering wheel angle, a superposition angle, a longitudinal vehicle speed, a longitudinal vehicle acceleration, and a lateral vehicle acceleration. In some embodiments, the ECU 14 obtains the information and signals directly from the sensors 20 to by-pass any software, hardware, or other bugs or malfunctions present in the steering controller 23. The ECU 14 can also obtain the signals from both the steering controller 23 and the individual sensors 25, 27, 29, and 31-34 to confirm the vehicle yaw dynamics (e.g., by comparing the signals to other signals the ECU 14 obtained directly or derived) and/or for detecting malfunctions or bugs in the steering controller 23.

Similarly, as shown in FIG. 2, the ECU 14 can receive information from a brake controller 36 of the braking system 15. The brake controller 36 transmits signals on the network 22 (or a separate connection) representing a current state of the vehicle's braking system. For example, the brake controller 36 can provide signals representing a brake pedal status, a master cylinder pressure, a wheel brake pressure, and a wheel speed. The brake pedal status indicates whether the driver is stepping on the brake pedal. The master cylinder pressure signal indicates how hard the driver is pressing on the brake pedal and the wheel speed signals indicate how fast a particular vehicle wheel is rotating and in what direction. As shown in FIG. 2, the brake controller 36 obtains these signals from a brake pedal sensor 37, a master cylinder pressure sensor 38, and wheel speed sensors 44. The ECU 14 can obtain these signals directly from the sensors 37, 38, and 44 to bypass any malfunctions or bugs present in the brake controller 36. Also, the ECU 14 can obtain signals from both the brake controller 36 and the individual sensors 37, 38, and 44 to confirm the existence of braking activity (e.g., by comparing the signals to other signals the ECU 14 obtained directly or derived) and/or for detecting malfunctions or bugs in the brake controller 36.

Figure 3:
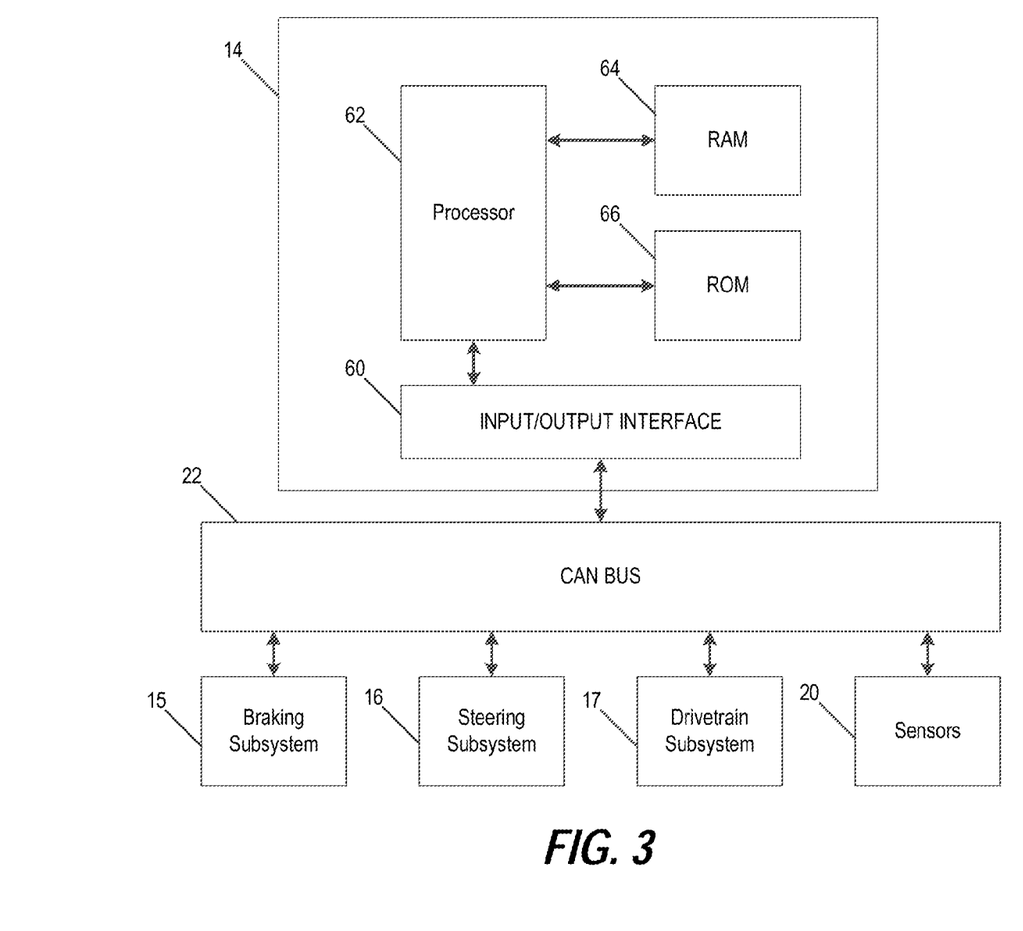
FIG. 3 is yet another schematic illustration of the vehicle control system of FIG. 1 illustrating the ECU and the network bus architecture in further detail.

FIG. 3 schematically illustrates an example of a vehicle control system 12 in more detail. As shown in FIG. 3, the system 12 includes the ECU 14, the plurality of sensors 20, and the network 22. As further discussed below, the ECU 14 can also communicate with other devices or systems through the network 22. The ECU 14 can also obtain information (i.e., data) directly from the sensors 20 rather than over the network 22. In some circumstances, the ECU 14 uses compensated sensor readings rather than raw data. For example, the ECU 14 can compensate one or more of the sensor readings by applying an offset. The ECU 14 can use the offsets to compensate for sensor aging, fouling, and other signal corruption that may occur. It should be understood that in some embodiments other types of sensors 20 can be included in the system 12. Also, the ECU 14 may only use information from a subset of the sensors 20 illustrated in FIGS. 1-3 to detect the vehicle yaw dynamics and braking activity. Furthermore, the arrangement and positions of the system components shown in FIGS. 1-3 is for illustrative purposes only. As illustrated in FIG. 3, the ECU 14 of the system 12 is also connected to the braking subsystem 15, the steering subsystem 16, and the drivetrain subsystem 17.

As shown in FIG. 3, the ECU 14 includes an input/output interface 60, a processor 62, and one or more non-transitory memory or computer-readable modules, such as a random access memory ("RAM") 64 and read-only memory ("ROM") 66. The input/output interface 60 transmits and receives data over the network 22, including data from the sensors 20. It should be understood that the ECU 14 can include multiple processors, additional computer-readable medium modules, multiple I/O interfaces, and/or other additional components or modules (e.g., hardware, software, or a combination thereof).

The input/output interface 60 allows the ECU 14 to communicate with other components inside the vehicle 10 (e.g., over the network 22) and outside of the vehicle 10. In other words, the input/output interface 60 receives data from outside the ECU 14 and outputs information outside the ECU 14. For example, the input/output interface 60 can include a network interface, such as a vehicle-to-vehicle communication device or a wireless network card that allows the system 12 to send and receive information over a network, such as a local area network or the Internet. In some embodiments, the input/output interface 60 is located external to the ECU 14 and may receive data from other devices or systems located in the vehicle 10. Similarly, the ECU 14 may be included within another vehicle control system rather than configured as a separate component. In addition, although not shown in FIG. 3, conditioning circuits or peripheral drivers may be used to interface the ECU 14 with the sensor 14.

In one embodiment, the ECU 14 is configured to communicate with the braking subsystem 15, the steering subsystem 16, and the drivetrain subsystem 17. The ECU 14 is configured to receive information from these systems. The EPU 62 receives the information from the input/output interface 60 and processes the information by executing one or more instructions software modules (which are also referred to as a "controller" or "controllers"). The instructions, modules, or controllers are stored in non-transitory computer-readable medium, such as ROM 66. The EPU 62 stores and retrieves information (e.g., information received from the network 22 or information generated by instructions or modules executed by the EPU 62) to and from the RAM 64. The non-transitory computer readable medium 65 includes volatile memory, non-volatile memory, or a combination thereof. The computer-readable medium 66 stores operating system software, applications and/or instructions, data, or combinations thereof. It should be understood that although only a single EPU, RAM, ROM, and input/output interface are illustrated in FIG. 2, the ECU 14 can include multiple processing units, memory modules, and/or input/output interfaces.

Although the ECU 14 is illustrated in FIGS. 1-3 as a separate component from the sensors 20, in some embodiments the ECU 14 can be combined with other vehicle components. For example, the ECU 14 is combined with the steering controller 23 or the sensors 20. In other embodiments, the ECU 14 is separate from the sensors 20 or the steering controller 23 to prevent faults (e.g., electrical, mechanical, or software-based) in the sensors 20 or the steering controller 23 from affecting the functionality provided by the ECU 14. The ECU 14 can also be combined with other vehicle controllers (e.g., the brake controller 36). For example, in some embodiments, the ECU 14 is included in an electronic stability control ("ESC") system or another internal vehicle system (e.g., ESP® designed by Robert Bosch). In particular, because an ESC or an ESP system typically receives signals from the sensors 20 illustrated in FIGS. 1-3, combining the ECU 14 with any of these systems decreases the number of independent controllers needed.

Figure 4:
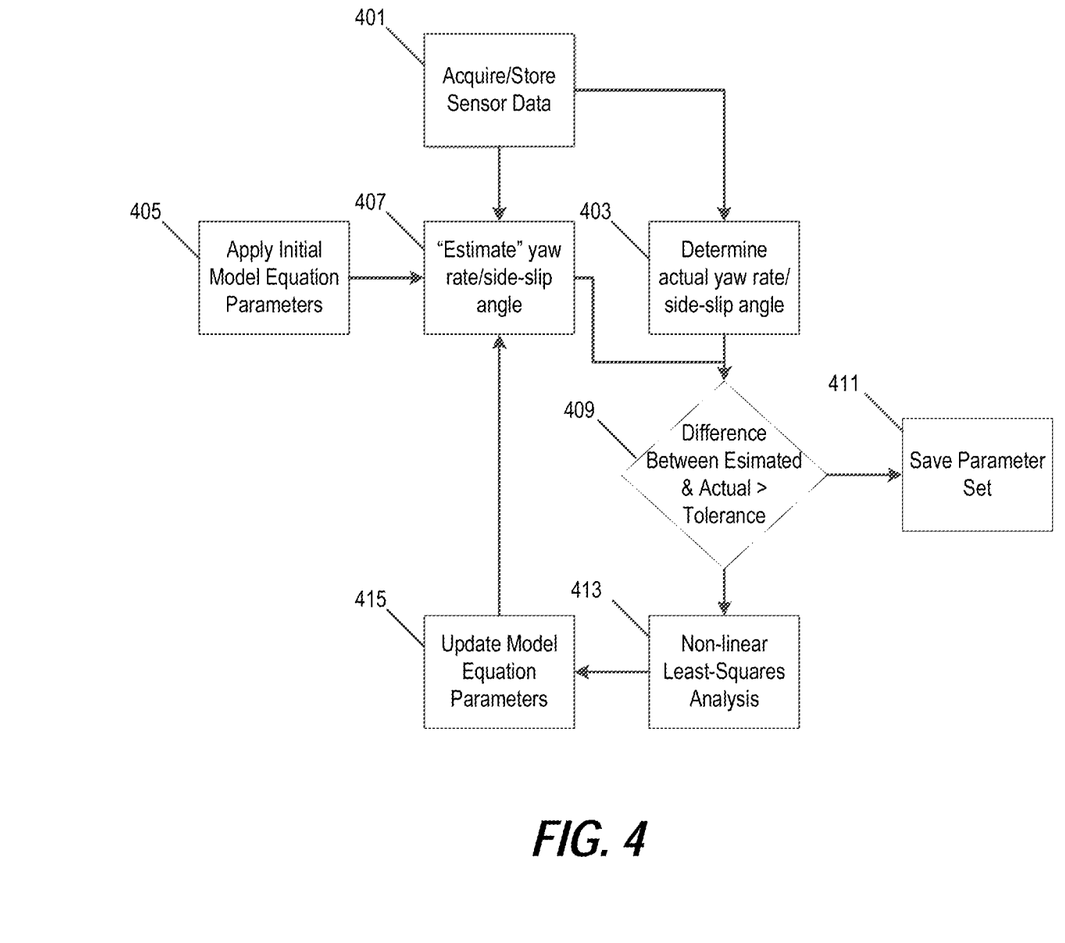
FIG. 4 is a flow chart illustrating a method for optimizing the parameters of the model equations used to control the vehicle in the system of FIG. 1.

The instructions stored in the computer-readable medium provide particular functionality when executed by the EPU 62. The ECU 14 includes hardware and software and these components cooperate to execute the logic of the nonlinear compensation system 12. In general, the instructions provide one or more ways for the system 12 to control the steering of the vehicle 10. FIG. 4 is a flow chart illustrating a method 70 for controlling the steering system of the vehicle 10. In other embodiments, similar methods can be used by the system 12 to control the braking system of the vehicle 10. The method 70 can be executed by the ECU 14. Various steps described herein with respect to the method 70 are capable of being executed simultaneously, in parallel, or in an order that differs from the illustrated serial manner of execution. The method 70 is also capable of being executed using additional or fewer steps than are shown in the illustrated embodiment.

As described in detail below, the ECU 14 in this example is configured to implement a non-linear compensation to adjust the steering angle applied to the wheels of the vehicle by the steering system 16 in order to directly control both the yaw rate and the side-slip angle of the vehicle. The non-linear compensation applied to the steering angle setting is based on model equations of the vehicle system that are experimentally derived and validated. One example of a nonlinear model implemented by the processor 62 can be represented as:

$$\dot{x} = f_V(x, z) + g_V(x, z) \cdot u \quad (1)$$

state vector $x = [x_1, x_2]^T := [\beta, \omega_Z]^T$, system input $u := \delta_M^F$, disturbance vector $z = [z_1, z_2]^T := \left[v, \dfrac{d}{dt}(v)\right]^T$ In this example, $f_v$ represents a part of the nonlinear function that is independent from the system input and $g_v$ represents a part of the nonlinear function that depends on (i.e., is being multiplied by) the system input. The system input u represents the steering angle that is applied to the active front steering system of the vehicle (i.e., the "supreme pose angle"). The system input u is an input to the steering system 16, but is an output of the nonlinear compensation controller implemented by the ECU 14. The state vector "x" as used in the model equation represents the actual yaw rate $\omega_z$ and the actual sideslip angle $\beta$ of the vehicle 10. The model equations are also based on the disturbance vector "z" which is indicative of the vehicle velocity and a derivative of the vehicle velocity.

In one example, the vehicle model illustrated in Equation (1) can be further defined by the following equations:

$$x = [x_1, x_2]^T,$$

$$f_V(x) := [f_{V1}(x), f_{V2}(x)]^T$$

and $$g_V(x) := [g_{V1}(x), g_{V2}(x)]^T$$

$$f_{V1}(x, z) := \frac{z_2}{z_1}(\lambda_v(z_2) \cdot \tan x_3 - \tan x_1) +$$

$$\frac{C_V(x_1, x_2, x_3, z_1) \cdot \alpha_V(x_1, x_2, z_1)}{m \cdot z_1 \cdot \cos x_3} \cdot (\sin^2 x_3 \cdot \lambda_v(z_2) + \cos^2 x_3) +$$

$$\frac{C_H(x_1, x_2, z_1) \cdot \alpha_H(x_1, x_2, z_1)}{m \cdot z_1} + x_2,$$

$$f_{V2}(x, z) := -\frac{l_V \cdot m \cdot z_2 \cdot \lambda_v(z_2) \cdot \tan u}{J_z} -$$

$$\frac{l_V \cdot C_V(x_1, x_2, x_3, z_1) \cdot \alpha_V(x_1, x_2, z_1)}{J_z \cdot \cos x_3} \cdot (\sin^2 x_3 \cdot \lambda_v(z_2) + \cos^2 x_3) +$$

$$\frac{l_H \cdot C_H(x_1, x_2, z_1) \cdot \alpha_H(x_1, x_2, z_1)}{J_z},$$

$$g_{V1}(x, z) := \frac{C_V(x_1, x_2, x_3, z_1)}{m \cdot z_1 \cdot \cos x_3} \cdot x_3 \cdot (\sin^2 x_3 \cdot \lambda_v(z_2) + \cos^2 x_3)$$

$$g_{V2}(x, z) := -\frac{C_V(x_1, x_2, x_3, z_1) \cdot l_V}{J_z \cdot \cos x_3} \cdot (\sin^2 x_3 \cdot \lambda_v(z_2) + \cos^2 x_3)$$

$$\lambda(a_x) := \frac{l_H}{l_V + l_H} - \frac{h_C}{l_V + l_H} \cdot \frac{a_x}{g};$$

($h_C$ := Center of Gravity height over ground)

As used in the equations described herein, x represents a state vector of the vehicle which is indicative of the actual yaw rate ($x_1$), actual side-slip angle ($x_2$), and a steering angle of the vehicle ($x_3$). "a" refers to the linear acceleration of the vehicle while $J_z$ refers to the moment of inertia about the z-axis of the vehicle. However, the vector "z" refers to a disturbance vector experienced by the vehicle as described above.

The functions C and α represent physical and operational characteristics of the vehicles including, for example, a brake efficiency coefficient (C). Variables "m," "l," and "$h_c$" refer to the mass, length and height of the vehicle, respectively Subscripts variables and functions marked with subscript "v" are related to the front of the vehicle while those marked with subscript "h" are related to the rear of the vehicle. Subscript "d" refers to desired or target values.

Finally, unless otherwise noted, variables such as "T" and "g" are assigned their commonly accepted meanings—in this case, time period and gravitational acceleration, respectively.

FIG. 4 illustrates one example of how the parameters of the model equations are optimized and validated to ensure efficient control of both the yaw rate and side-slip angle of the vehicle. As the vehicle is operated, the vehicle sensors 20 acquire and stores data indicative of the vehicle performance (i.e., steering system input u, longitudinal acceleration, lateral acceleration, etc.) (step 401). Based on the stored date, the actual yaw rate $\omega_z$, and the actual sideslip angle $\beta$ are determined (step 403). The initial values for the model equation parameters (as described above) are applied to the model equation (step 405) and "estimated" values of the yaw rate and side-slip angle are calculated using the model equation (step 407). As described above, the initial values of the parameters are based on known values such as, for example, vehicle mass, vehicle inertia moment, vehicle geometry, side-slip coefficients, steering ratio, brake coefficients, and road wheel radius. The estimated values are compared to the actual values to determine whether the deviation (i.e., error) exceeds tolerance threshold (step 409).

If the tolerance threshold is not exceeded, the parameter set is saved (step 411) for later use during normal operation of the vehicle. However, if the tolerance threshold is exceeded, the parameters must be optimized so that the model equations better represent the actual operation of the vehicle system. One method of optimizing the parameters is to perform a non-linear, least-squares analysis (such as, for example, the lsqnonlin function of the Matlab/Optimization Toolbox) on the stored data (step 413). This analysis adjusts the parameters of the model equations to fit the actual measured yaw rate and side-slip angle data. Once a parameter set has been identified that better fits the actual measured data, the model equation parameters are updated (step 415) and the estimated yaw rate/side-slip angle are again calculated based on the updated/optimized model equations. This optimization routine is repeated until the deviation between the estimated and measured values falls within the defined tolerance.

Figure 5A:
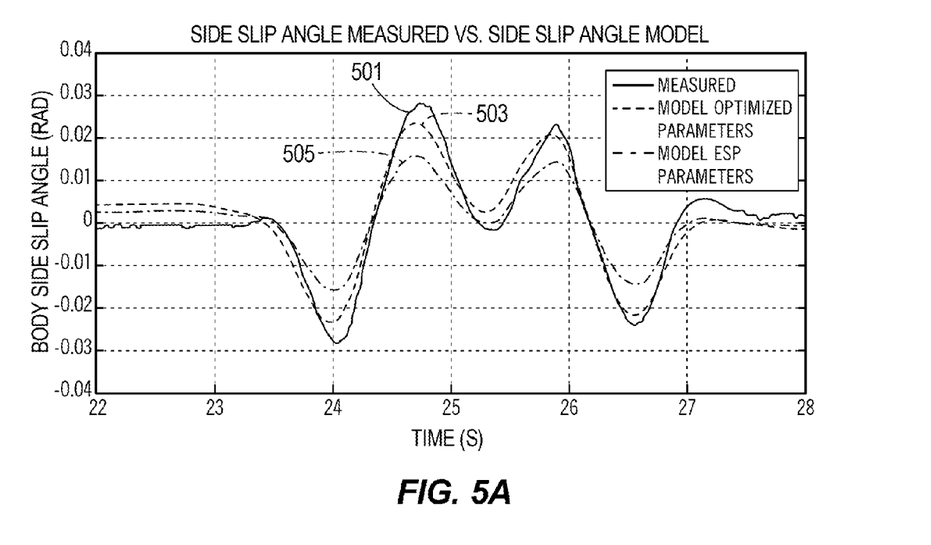
FIGS. 5A and 5B are graphs illustrating the measured side-slip angle and yaw rate of a vehicle compared to the estimated values calculated by the model equations.
Figure 5B:
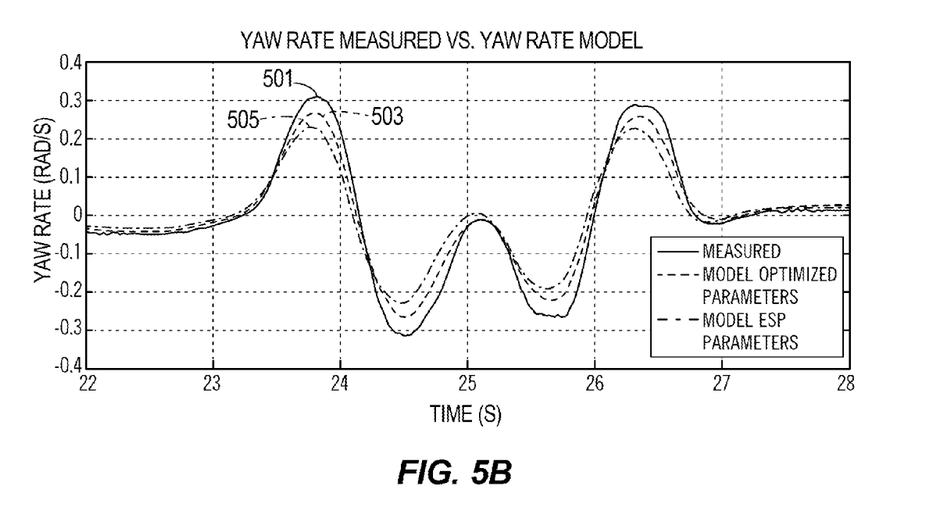

FIG. 5A illustrates the measured side-slip angle and the side-slip angle as calculated by the model equations as a function of time. Data set 501 represents the actual measured side-slip angle of the vehicle. Data set 503 represents the estimated side-slip angle as calculated by the model equation using the optimized parameter set. Data set 505 represents the estimated side-slip angle as calculated by the model equation using the initial parameter set. Similarly, FIG. 5B illustrates the actual measured yaw rate (data set 501), the estimated yaw rate using the optimized model equation parameters (data set 503), and the estimated yaw rate using the initial model equation parameters (data set 505). As shown in FIGS. 5A and 5B, the estimated side-slip angle and the estimated yaw rate more accurately reflect the actual values after the parameter optimization is performed.

The parameter optimization in the example illustrated in FIG. 4 is performed experimentally during development and calibration of a vehicle. Sensor data is stored and processed later on a desktop computer to derive the optimized parameter set for the model equations. However, in some constructions, the parameter optimization routines can be implemented in the electronic control unit 14 and can be performed periodically during normal operation of the vehicle to ensure that the parameter set is still applicable. Furthermore, in some other constructions, a service professional can recalibrate the parameter set to optimize the model equations.

Figure 6:
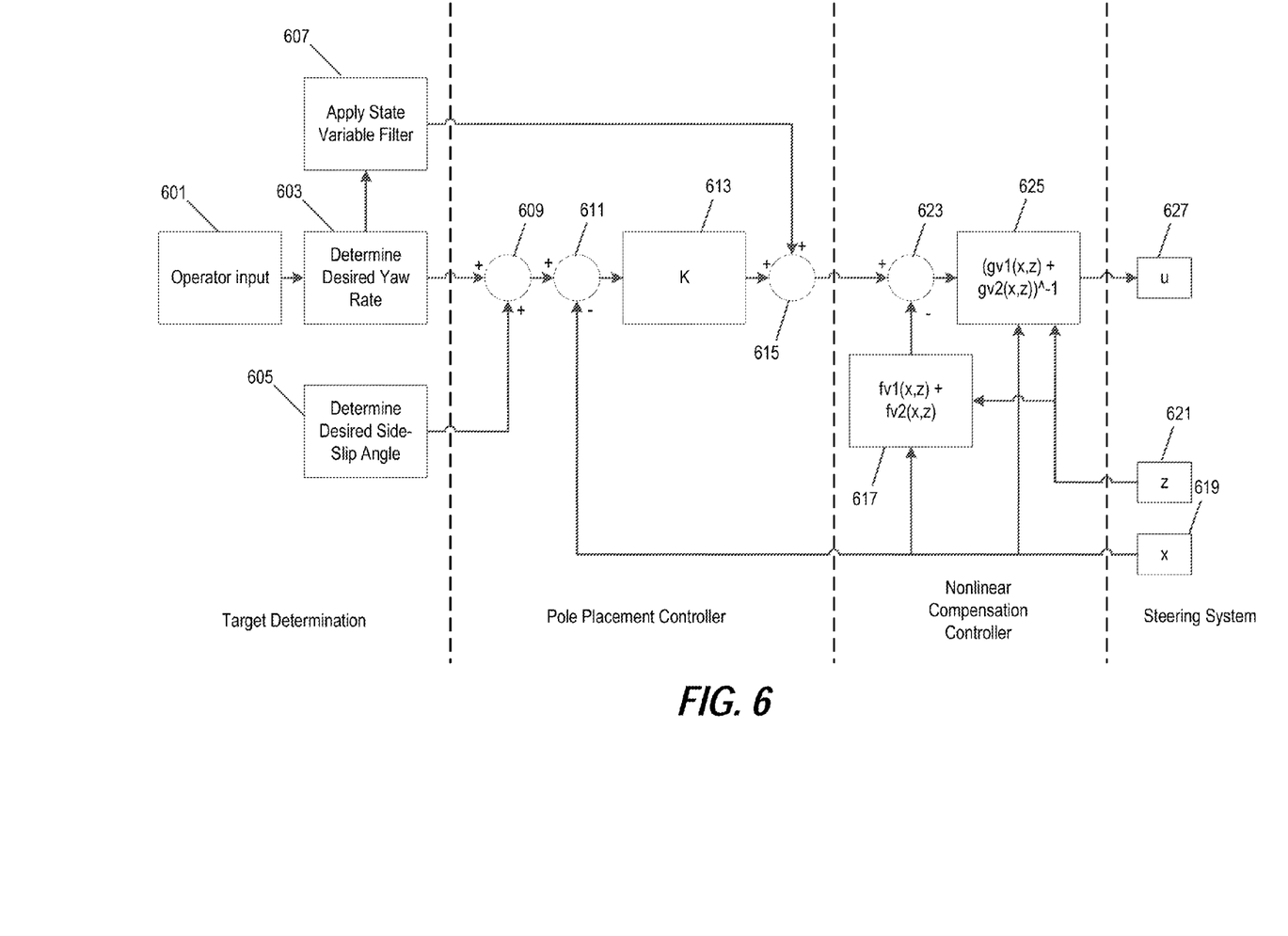
FIG. 6 is a diagram illustrating the operation of the nonlinear compensation controller of the vehicle control system of FIG. 1.

After the model equation parameters have been optimized, the data is stored to the memory of the vehicle's electronic control unit 14 and used to implement the nonlinear compensation of the steering system input. FIG. 6 is a flow chart illustrating how the electronic control unit implements the nonlinear compensation control of the steering system input based on the model equations described above. The ECU 14 begins by receiving operator input (step 601) from the steering wheel, brake pedal, accelerator, and other controls of the vehicle. Based on these operator input values, the ECU 14 determines a target yaw rate for the vehicle (step 603). The ECU also determines a target side-slip angle value (step 605). In this example, the target side-slip angle value is a stored value accessed from memory. To reduce side-slipping, the target side-slip angle value can be set to zero (or substantially equal to zero). However, this value can be tuned to achieve target performance in non-standard driving situations (e.g., during racing situations). The ECU 14 applies a state variable filter (step 607) to computer time derivatives ($\dot{x}$) and filtered time derivatives of the yaw rate which will be used later to determine an initial steering system input value (u').

The values of the target yaw rate and target side-slip angle are then combined to produce a target state vector x or, in some constructions, a weighted sum value (step 609). The ECU 14 then calculates a difference between the measured state vector 619 (or weighted sum of ($x_1+x_2$) (e.g., $x_1+x_2=k_1*\beta+k_2*\omega_z$)) and the target state vector/weighted sum (step 611). The deviation between the target and the actual measured values is multiplied by a factor K (step 613) and the result is added to the time derivative of the desired yaw rate (step 615). The output of step 615 represents an initial value for the steering system input (e.g., an actuator setting or supreme pose angle u'). Then the nonlinear compensation controller is applied to the initial value to calculate a compensated steering system input value u.

As described above, the optimized model equation can be separated into multiple components. A first component of the model equation is calculated based on the previously optimized parameters, the measured values of the state vector x (i.e., the actual yaw rate and the actual side-slip angle) and the disturbance vector z (step 617). This first component is then subtracted from the initial value of the steering system input u' (step 623). The difference is then multiplied by the inverse of the second component of the model equation (step 625) which is also calculated based on the previously optimized parameters, the measured values of the state vector x, and the disturbance vector z. The result is the compensated steering system input u which is provided to the steering system and used to control the active steering of the vehicle (e.g., the angle of the front wheels of the vehicle is set based on the steering system input u).

By implementing this nonlinear compensation control strategy, the ECU 14 is able to directly control both the yaw rate and the side-slip angle of the vehicle by adjusting the active steering. This is because the relative degree of control (r=1) of the controller is smaller than the dimensions of the system that is being controlled (n=2).

In this particular system the ECU 14 is intended to control two dimensions of the steering system—yaw rate and side-slip angle. The dimensions of the system can be represented by the equation:

$$y=x_1+x_2 \quad (2)$$

The relative degree of control indicates the number of derivatives relating the dimensions of the system that are being controlled (i.e., $x_1+x_2$) and the system input (i.e., u). As described above, the first derivative of the system dimensions (i.e., yaw rate and side-slip angle) can be represented as:

$$\dot{y}=\dot{x}_1+\dot{x}_2=f_{v1}(x)+f_{v2}(x)+(g_{v1}(x)+g_{v2}(x))*u$$

Therefore, the relative degree of control in the system describe above is one (r=1) and, given this relationship in the model equations used to define the system, the single control variable (i.e., steering system input) can be used to accurately control both of the system dimensions (i.e., yaw rate and side-slip angle).

In the examples described above, the nonlinear compensation controller adjusts an actuator setting that is used by an electronic active steering system to control the vehicle steering by adjusting the angle of the front wheels of the vehicle. However, in other constructions, the nonlinear compensation controller is configured to adjust a different vehicle actuator. For example, a nonlinear compensation controller can be used to adjust the braking force applied to one or more wheels of the vehicle to affect the steering (e.g., the yaw rate and the side-slip angle).

Thus, the invention provides, among other things, a system for directly controlling both yaw rate and side-slip angle of a vehicle by applying model-based nonlinear compensation to steering system input. Various features and advantages of the invention are set forth in the following claims.

What is claimed is:

1. A method for controlling vehicle steering, the method comprising:
   determining a target yaw rate and a target side-slip angle for a vehicle;
   determining an initial vehicle actuator setting based on operator input;
   applying a non-linear vehicle model to calculate a compensated vehicle actuator setting based on the initial vehicle actuator setting, an actual yaw rate of the vehicle, and an actual side-slip angle of the vehicle
   wherein the actual side-slip angle of the vehicle is detected by a side-slip angle sensor; and
   controlling a vehicle actuator based on the compensated vehicle actuator setting to cause the actual yaw rate to approach the target yaw rate and to cause the actual side-slip angle to approach the target side-slip angle.

2. The method of claim 1, wherein the vehicle actuator is a steering system that adjusts an angle of at least one front wheel of the vehicle and the initial vehicle actuator setting is a value indicative of the angle of the at least one front wheel.

3. The method of claim 1, wherein the target yaw rate is determined based at least in part on the operator input.

4. The method of claim 1, wherein the initial vehicle actuator setting is determined based on the target yaw rate, the target side-slip angle, the actual yaw rate, and the actual side-slip angle.

5. The method of claim 1, wherein the operator input includes an angle of a steering wheel in the vehicle.

6. The method of claim 1, wherein the target side-slip angle is zero.

7. The method of claim 1, wherein applying the non-linear vehicle model to calculate the compensated vehicle actuator setting includes calculating the compensated vehicle actuator setting according to the equation:

$$u=[u'-f(x,z)]/g(x,z)$$

wherein
   u is the compensated vehicle actuator setting,
   u' is the initial vehicle actuator setting,
   x is a state vector including the actual yaw rate and the actual side-slip angle,
   z is a disturbance vector based on a derivative of vehicle velocity, and
   f(x,z) and g(x,z) are components of a non-linear model equation of the vehicle steering defined by $\dot{x}=f(x,z)+g(x,z)*u$.

8. The method of claim 7, wherein the non-linear model equation of the vehicle system is derived experimentally based at least in part on parameter optimization.

9. The method of claim 8, wherein the parameter optimization includes
   defining a plurality of initial parameters of the non-linear model equation based on measured vehicle characteristics,
   calculating an estimated yaw rate and an estimated side-slip angle based on the non-linear model equation including the plurality of initial parameters,
   measuring the actual yaw rate and the actual side-slip angle,
   determining a deviation between the actual yaw rate and the estimated yaw rate and a deviation between the actual side-slip angle and the estimated side-slip angle, and
   when the deviation is greater than an defined acceptable tolerance, adjusting the plurality of initial parameters such that the estimated yaw rate and the estimated side-slip angle approach the actual yaw rate and the actual side-slip angle.

10. The method of claim 9, wherein the act of adjusting the plurality of initial parameters includes applying a non-linear least squares parameter optimization algorithm.

11. A nonlinear compensation controller for controlling vehicle steering, the nonlinear compensation controller including a processor and memory storing instructions that, when executed by the processor, cause the nonlinear compensation controller to:
   receive an initial steering angle setting determined based, at least in part, on a position of a steering wheel operated by a driver of the vehicle,
   apply a non-linear vehicle model to calculate a compensated steering angle setting based on the initial steering angle setting, an actual yaw rate of the vehicle, and an actual side-slip angle of the vehicle
   wherein the actual side-slip angle of the vehicle is detected by a side-slip angle sensor, and
   provide the compensated steering angle setting to a steering system of the vehicle, wherein the steering system of the vehicle controls an angle of at least one front wheel of the vehicle based on the compensated steering angle and, by applying the compensated steering angle setting, causes the actual yaw rate to approach a target yaw rate and the actual side-slip angle to approach a target side-slip angle.

12. A method for controlling vehicle steering, the method comprising:
   determining a target yaw rate and a target side-slip angle for a vehicle;
   determining an initial steering angle setting based, at least in part, on a position of a steering wheel operated by a driver of the vehicle;
   applying a non-linear vehicle model to calculate a compensated steering angle setting based on the initial steering angle setting, an actual yaw rate of the vehicle, and an actual side-slip angle of the vehicle
   wherein the actual side-slip angle of the vehicle is detected by a side-slip angle sensor; and
   controlling a steering system of the vehicle based on the compensated steering angle setting, wherein the steering system of the vehicle controls an angle of at least one front wheel of the vehicle based on the compensated steering angle and, by applying the compensated steering angle setting, causes the actual yaw rate to approach the target yaw rate and the actual side-slip angle to approach the target side-slip angle.

* * * * *